United States Patent
Su et al.

(10) Patent No.: US 8,600,111 B2
(45) Date of Patent: Dec. 3, 2013

(54) VEHICULAR TILT-SENSING METHOD AND AUTOMATIC HEADLIGHT LEVELING SYSTEM USING THE SAME

(75) Inventors: Yi-Feng Su, Changhua County (TW); Hsueh-Lung Liao, Changhua County (TW)

(73) Assignee: Automotive Research & Test Center, Changhua County (TW)

( * ) Notice: Subject to any disclaimer, the term of this patent is extended or adjusted under 35 U.S.C. 154(b) by 1061 days.

(21) Appl. No.: 12/588,222

(22) Filed: Oct. 8, 2009

(65) Prior Publication Data

US 2010/0309674 A1 Dec. 9, 2010

(30) Foreign Application Priority Data

Jun. 5, 2009 (TW) ................................ 98118705 A

(51) Int. Cl.
*G06K 9/00* (2006.01)
(52) U.S. Cl.
USPC .......................................... 382/104; 362/466
(58) Field of Classification Search
None
See application file for complete search history.

(56) References Cited

U.S. PATENT DOCUMENTS

| 2007/0165909 A1* | 7/2007 | Leleve et al. | 382/104 |
| 2008/0013790 A1* | 1/2008 | Ihara et al. | 382/104 |
| 2009/0067184 A1* | 3/2009 | Kamioka et al. | 362/464 |
| 2009/0323366 A1* | 12/2009 | Furusawa | 362/466 |

* cited by examiner

*Primary Examiner* — Brian P Werner
(74) *Attorney, Agent, or Firm* — Rosenberg, Klein & Lee

(57) ABSTRACT

The present invention discloses a vehicular tilt-sensing method and an automatic headlight leveling system using the same. The method of the present invention comprises steps: using an image capture device to capture an image of the road and obtain at least one instantaneous lane marking line from the image; extending the instantaneous lane marking lines afar to obtain an instantaneous vanishing point; establishing an instantaneous horizontal line passing through the instantaneous vanishing point; calculating from the image the displacement between a datum horizontal line and the instantaneous horizontal line; and calculating the tilt angle with the displacement and the focal length of the image; using the tilt angle to generate a control signal to control level adjusting controllers to adjust headlights, whereby the headlights can provide optimized illumination to enhance night driving safety on a rugged road or in the case that the vehicle is unevenly loaded.

17 Claims, 10 Drawing Sheets

(a)

(b)

(c)

VEHICULAR TILT-SENSING METHOD AND AUTOMATIC HEADLIGHT LEVELING SYSTEM USING THE SAME

FIELD OF THE INVENTION

The present invention relates to a vehicular tilt-sensing method, particularly to a method using an image processing technology to sense the tilt of a vehicle and an automatic headlight leveling system using the method.

DESCRIPTION OF THE RELATED ART

The headlight plays an important role in providing vision for drivers at night. Refer to FIG. 1. The US FMVSS 108 (Federal Motor Vehicle Safety Standard) has provided regulations about the headlight and back mirror. The EU ECE R48 (European Union Economic Commission for Europe Regulation No. 48) also provides regulations concerning the headlight-related parameters, such as the headlight installation height h2, the angle θ by which a headlight projects to the ground, headlight patterns, the length R of the illumination area of a headlight.

However, the headlight may have some problems on a sloped road. When a vehicle moves uphill from a plane, the illumination distance of the headlight is shortened. When a vehicle moves downhill from a plane, the headlight generates glare dazzling the drivers on the opposite lanes. Besides, load may lower a vehicle and decrease the illumination distance of the headlight.

Thus, some automatic and real-time headlight leveling devices were proposed. For example, a tilt-sensing device uses variable resistors respectively installed in the front axle and the rear axle to detect the tilt of a vehicle, wherein the inclined vehicle body causes resistance variation, and the tilt angle is worked out from the difference between the front resistance and the rear resistance, whereby is adjusted the projection angle θ of the headlights. However, the installation of the abovementioned tilt-sensing device is very complicated. Further, the tilt-sensing device is exposed from the chassis and likely to be damaged by collision or other external factors. There is another device using a G-sensor and a precision potentiometer to replace the above-mentioned tilt-sensing device and obtain more accurate tilting data. However, the precision components are expensive and greatly increase the cost. Besides, the device can only detect tilt without another application.

Accordingly, the present invention proposes a vehicular tilt-sensing method and an automatic headlight leveling system using the same to overcome the abovementioned problems.

SUMMARY OF THE INVENTION

The primary objective of the present invention is to provide a vehicular tilt-sensing method and an automatic headlight leveling system using the same, which can learn the road state in front of the vehicle beforehand, determine the tilt angle of the vehicle according to the road state, and adjust the headlights in real time to have an appropriate illumination range.

Another objective of the present invention is to provide a vehicular tilt-sensing method and an automatic headlight leveling system using the same, which can maintain an appropriate illumination range via adjusting the headlights according to the load or the road state to improve the illumination effect and enhance night driving safety.

Still another objective of the present invention is to provide a vehicular tilt-sensing method and an automatic headlight leveling system using the same, wherein the image processing and recognition technology is used to establish a delicate and effective tilt-sensing method to predict the status of the rugged road before the vehicle.

A further objective of the present invention is to provide a vehicular tilt-sensing method and an automatic headlight leveling system using the same, which detects the lane marking lines and extends the lane marking lines afar to obtain the vanishing point before the vehicle and evaluate the tilt angle of the vehicle, whereby the headlights are controlled to maintain an appropriate illumination effect.

To achieve the abovementioned objectives, the present invention proposes a vehicular tilt-sensing method, which comprises steps: capturing a road image before a vehicle; processing the road image to obtain at least one instantaneous lane marking line; extending the instantaneous lane marking line to obtain an instantaneous vanishing point; establishing an instantaneous horizontal line passing through the instantaneous vanishing point; calculating from the images the displacement between the instantaneous horizontal line and a datum horizontal line obtained when the vehicle is on an absolute horizontal plane; and calculating the tilt angle of the vehicle with the displacement and the focal length of the image capture device on the vehicle.

The tilt angle obtained with the method of the present invention can be applied to a headlight leveling system or a vehicular suspension control system. The present invention uses the tilt angle obtained with the method to realize an automatic headlight leveling system, wherein the tilt angle is converted into a control signal, and the control signal is sent to at least one level adjusting controller, which is coupled to at least one headlight, to adjust the angle of the headlight.

Below, the embodiments are described in detail in cooperation with the attached drawings to make easily understood the objectives, technical contents, characteristics and accomplishments of the present invention.

DETAILED DESCRIPTION OF THE INVENTION

In the vehicular tilt-sensing method of the present invention, the image of the road before a vehicle is captured firstly. Next, an image processing/analyzing technology is used to process and analyze the captured image to learn the road status before the vehicle. Below, a vehicle having an automatic headlight leveling system using the vehicular tilt-sensing method is used as a preferred embodiment to exemplify the technology of the present invention. However, the present invention is not limited by the embodiment. Any device using the vehicular tilt-sensing method is also included within the scope of the present invention.

Figure 1:
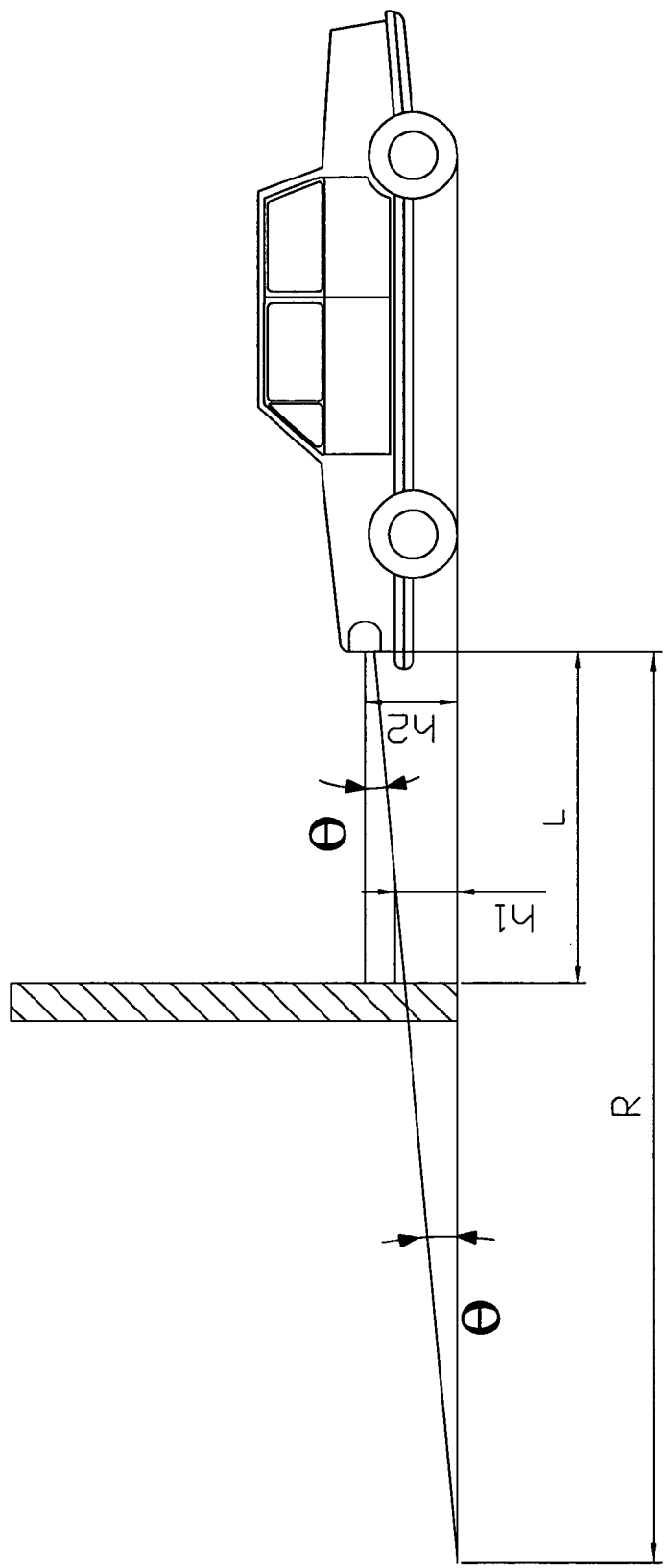
FIG. 1 is a diagram schematically showing the headlight-related parameters used in US FMVSS 108 and EU ECE R48.
Figure 2:
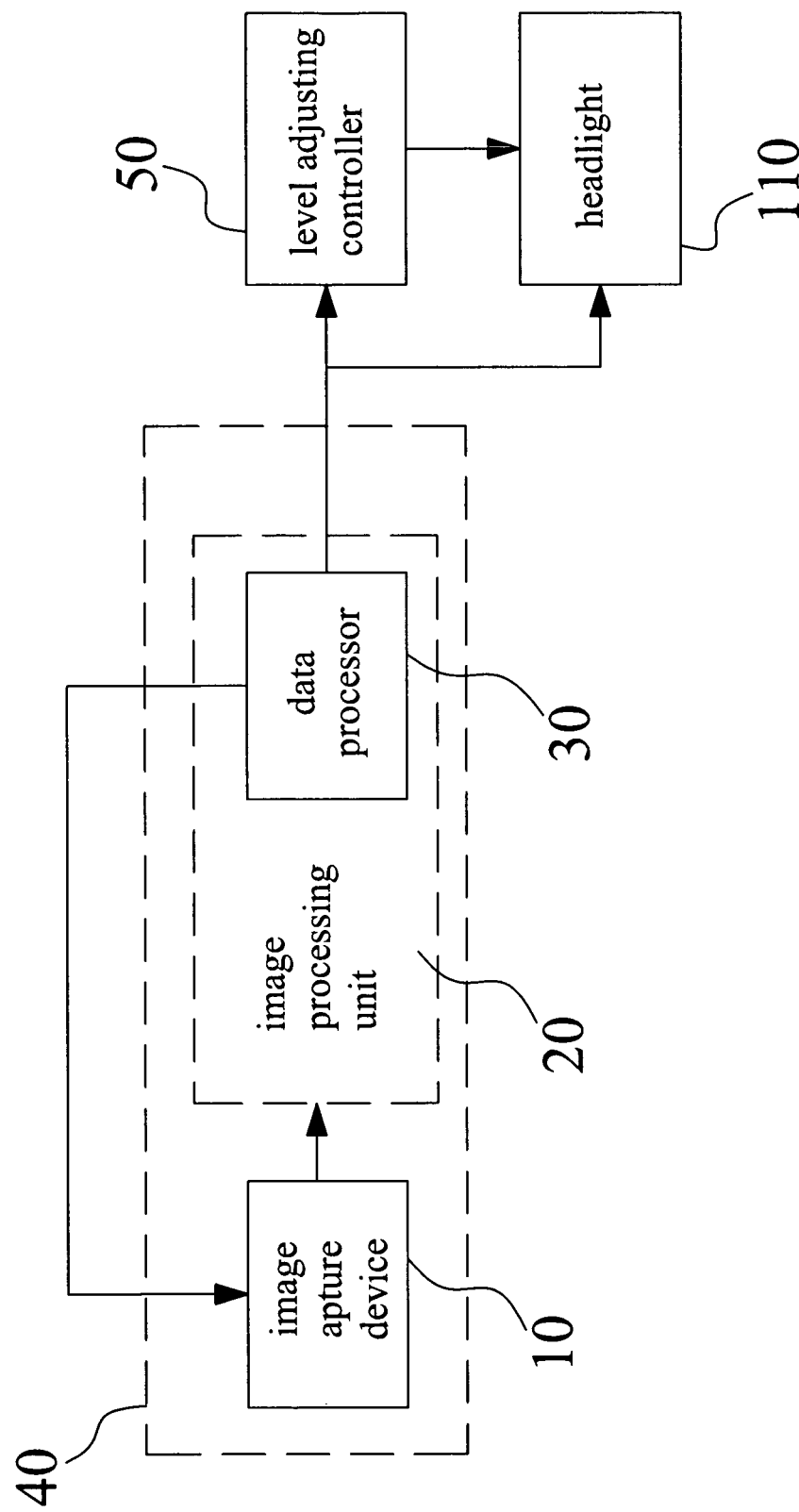
FIG. 2 is a block diagram schematically showing the architecture of an automatic headlight leveling system according to the present invention.

A common vehicle should have at least two headlights. The present invention is to be demonstrated with a preferred embodiment, wherein an automatic headlight leveling system realizes the vehicular tilt-sensing method of the present invention. Refer to FIG. 2 a block diagram schematically showing the architecture of an automatic headlight leveling system according to the present invention. In this embodiment, the automatic headlight leveling system comprises an image capture device 10, an image processing unit 20 containing a data processor 30, and two level adjusting controllers 50. The image capture device 10, the image processing unit 20 and the data processor 30 jointly form the framework 40 of the automatic headlight leveling system of the present invention. The image capture device 10 may be realized with a CCD (Charge Coupled Device) device or a CMOS (Complementary Metal Oxide Semiconductor) device. The image capture device 10 is electrically connected to the image processing unit 20, which contains the data processor 30. The image processing unit 20 is electrically connected to the two level adjusting controllers 50. The rotation shafts of the two level adjusting controllers 50 are respectively coupled to two headlights 110 of a vehicle 100. A motor may be used to drive the level adjusting controller 50 to rotate the headlight 110. In the present invention, the data processor 30 is not necessarily contained in the image processing unit 20 but may be an independent digital signal processor electrically connected to the image processing unit 20. It is reasonable to claim that any modification or variation according to the spirit of the present invention is also the embodiment of the present invention and included with the scope of the present invention.

Figure 3:
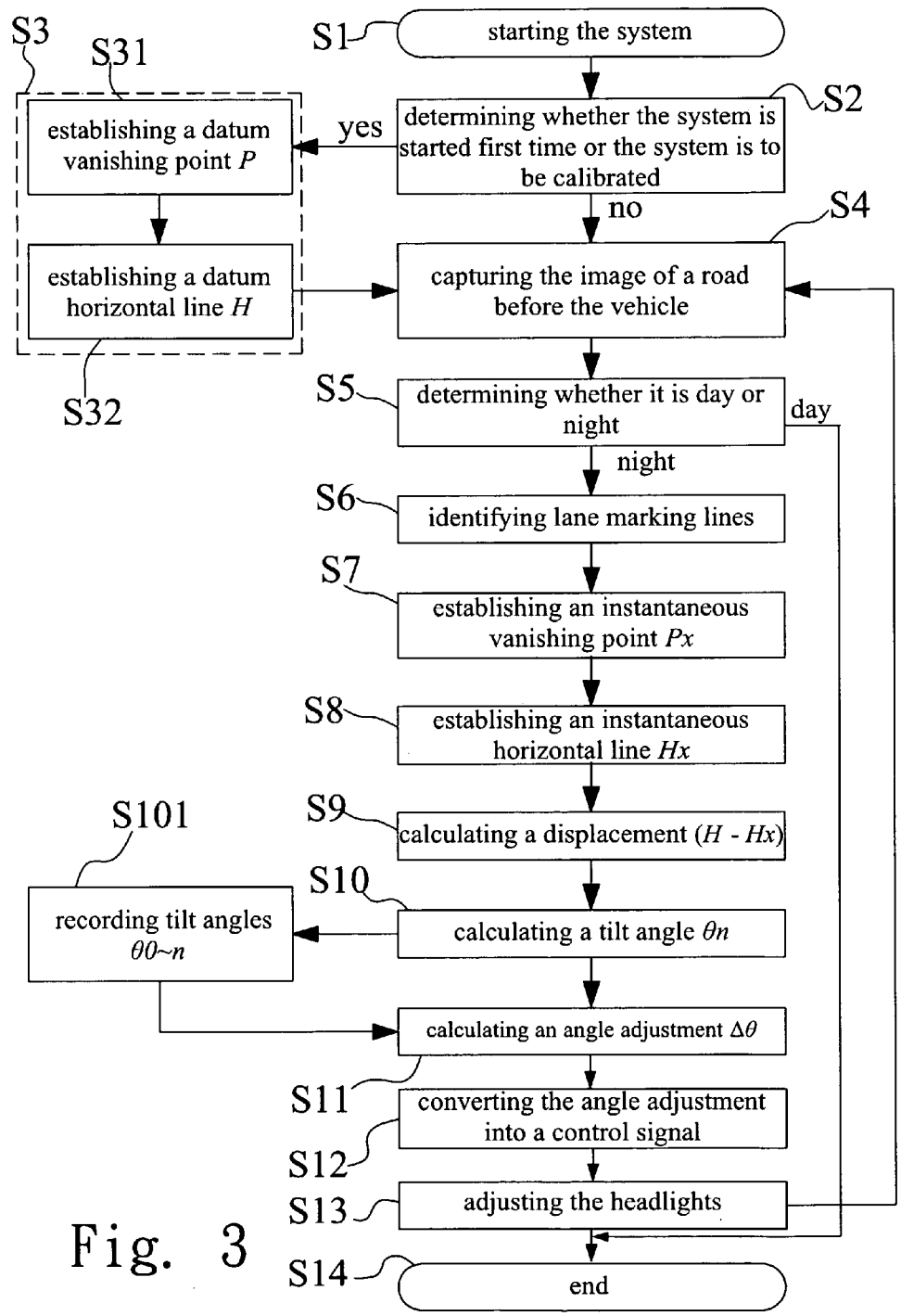
FIG. 3 is a flowchart of a vehicular tilt-sensing method according to the present invention.
Figure 4:
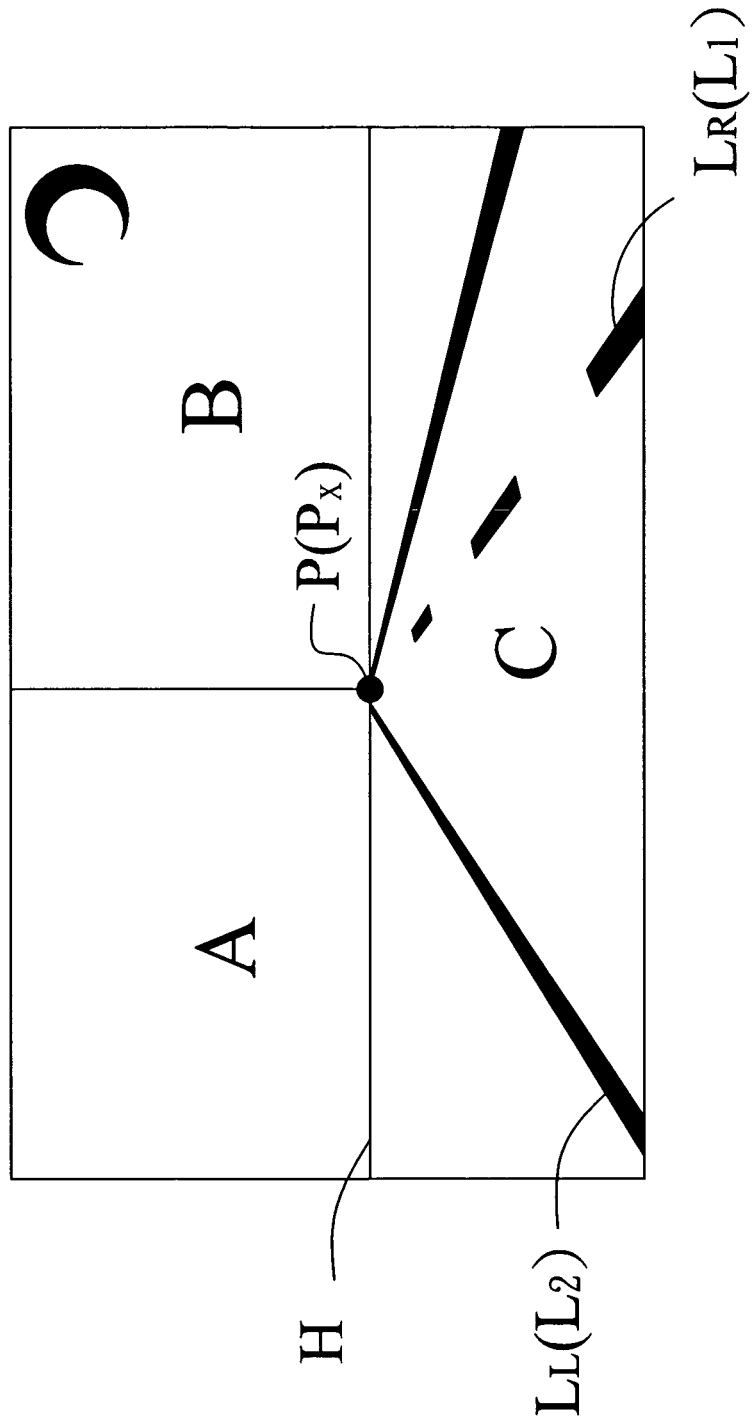
FIG. 4 is a diagram schematically showing the relationship of the displacement and the datum horizontal line according to the present invention.
Figure 5:
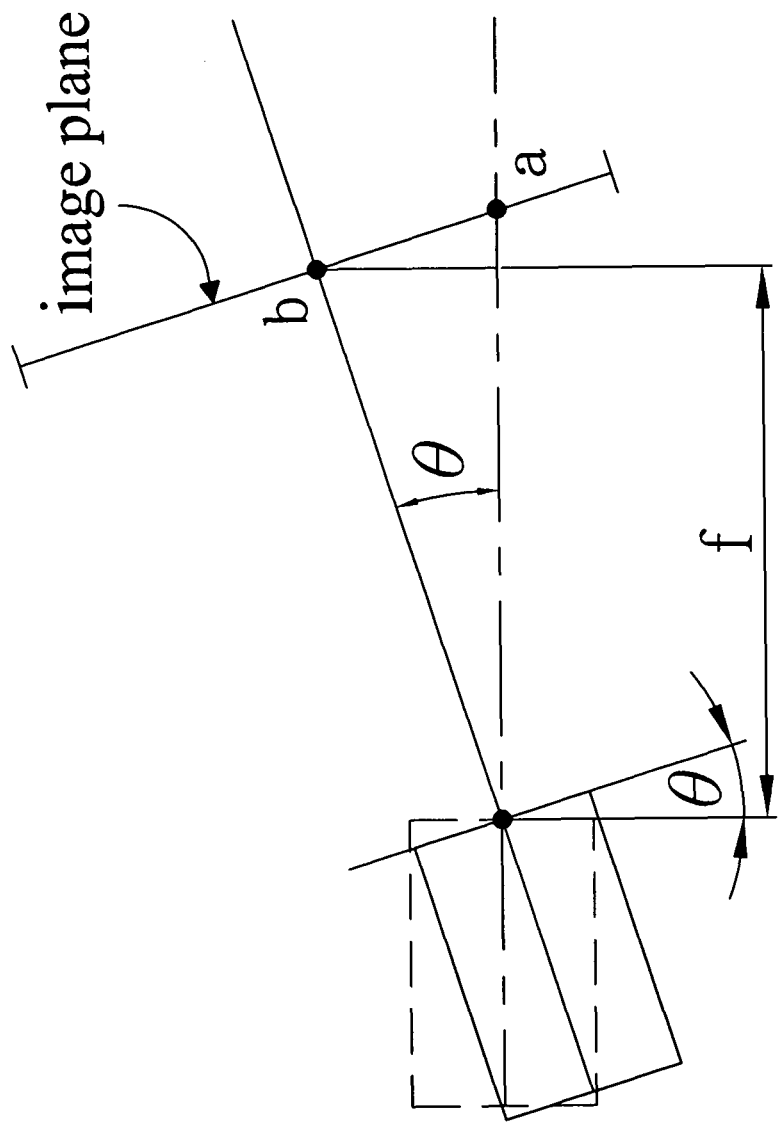
FIG. 5 is a diagram schematically showing the relationship of the focal length of the camera and the datum horizontal line according to the present invention.

Refer to FIG. 3 a flowchart of a vehicular tilt-sensing method applied to an automatic headlight leveling system according to the present invention. In Step S1, the automatic headlight leveling system is started. The system can be started simultaneously when the vehicle is started. Alternatively, the driver may start the system at an appropriate timing. In Step S2, the system determines whether it is started first time, or the driver determines whether to calibrate the datum horizontal line H; if the answer is "yes", the process proceeds to Step 3; if the answer is "no", the process proceeds to Step 4. In Step S3, establishing a datum horizontal line H is based on the assumption that the vehicle is loaded uniformly and situated on an absolute horizontal plane. Refer to FIG. 4. At this time, in Step S31, the data processor 30 extends lane marking lines $L_L$ and $L_R$ afar to form a visual vanishing point, which is a datum vanishing point P observed by the image capture device 10. In Step S32, a horizontal line passing through the datum vanishing point P is used as the datum horizontal line H. After Step S3, the process proceeds to Step S4 to capture an image of the road in front of the vehicle. Refer to FIG. 5 a diagram demonstrating the relationship of the angle, focal point and datum horizontal line observed by the image capture device 10 in a vehicle, which is moving uphill or head-up by uneven load. The relationship is expressed by Equation (1):

$$\theta = \tan^{-1} \frac{a-b}{f} \quad (1)$$

wherein θ is the included angle generated by the rotation of the central axis of the lens of the camera, b the datum vanishing point on the image plane, a the instantaneous vanishing point on the image plane, f the distance between the lens and the image plane (i.e. the focal length).

Figure 6:
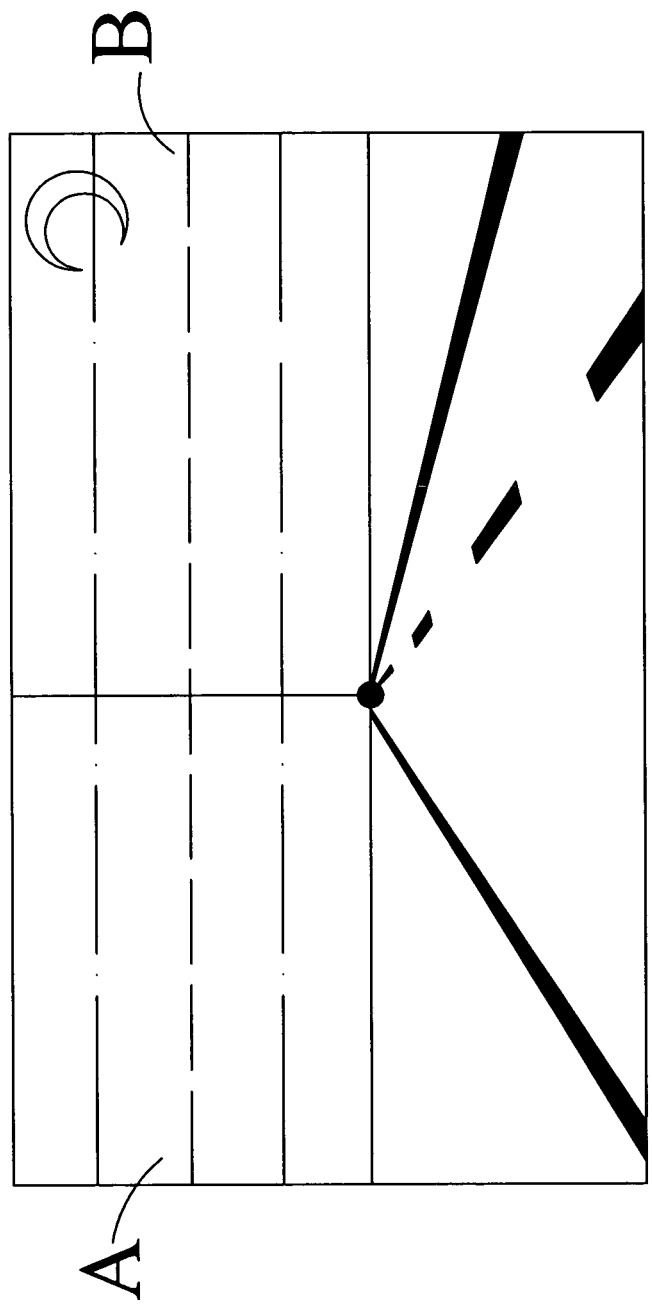
FIG. 6 is a diagram schematically showing the step to determine whether it is day or night according to the present invention.

If the answer is "no" in Step S2, it means that there are an existing datum vanishing point P and an existing datum horizontal line H. Thus, the process directly proceeds to Step S4 to start the image capture camera 10 to capture an image of the road before a vehicle 100. In Step S4, the captured image is sent to the image processing unit 20, and the image processing unit 20 divides the image into Block A, Block B, and Block C, wherein Block A and Block B are in the upper half of the image, and Block C is in the lower half of the image. Next, the process proceeds to Step S5 to process the images of Block A and Block B to determine the ambient illumination. Refer to FIG. 6. Determining the ambient illumination to is to determine whether it is day or night. Block A and Block B are divided into several horizontal sections by lines. Equations (2) and (3) are used to calculate the brightness values of the pixels in Block A and Block B:

$$\frac{\sum_x \sum_y \text{gray} < th_{dark}}{\sum_x \sum_y 1} > TH_{night} \Rightarrow \text{Night} \quad (2)$$

$$\frac{\sum_x \sum_y \text{gray} < th_{dark}}{\sum_x \sum_y 1} < TH_{day} \Rightarrow \text{Day} \quad (3)$$

wherein gray is the gray level of each pixel, $th_{dark}$ the threshold for darkness, $TH_{night}$ the threshold for night, and $TH_{day}$ the threshold for day. The brightness values of Block A and Block B are compared with the thresholds. When the brightness values are lower than $TH_{night}$, it is determined to be night. When the brightness values are greater than $TH_{day}$, it is determined to be day. When it is determined to be day, the process proceeds to Step S14 and ends there. When it is determined to be night, the process proceeds to Step S6 to identify lane marking lines. However, determining whether it is day or night is not limited to the abovementioned measure but may be realized via a photosensor or via checking whether the headlights are switched on.

Figure 7:
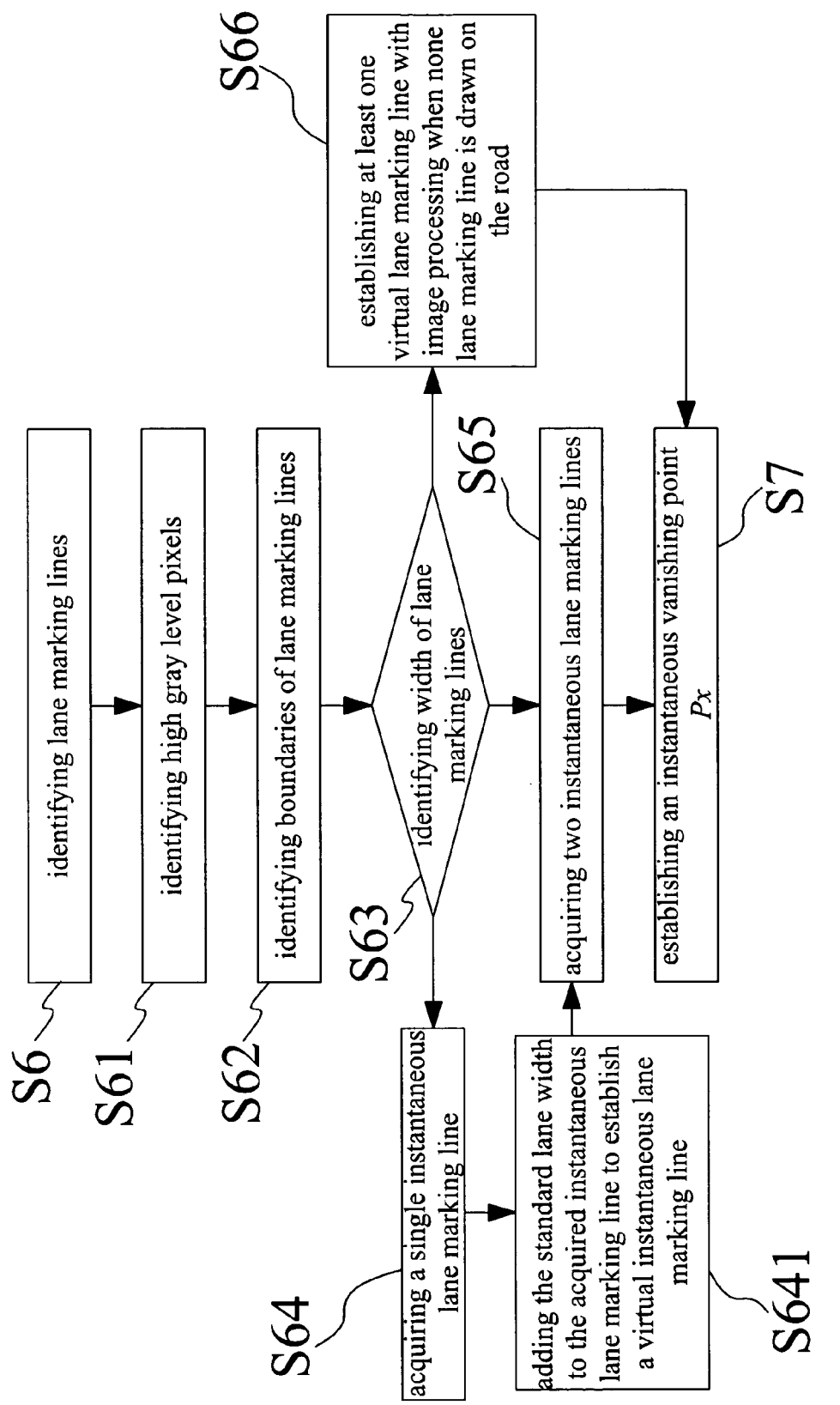
FIG. 7 is a flowchart of the process to identify lane marking lines according to the present invention.

Refer to FIG. 7 a flowchart of the process to identify lane marking lines. In Step S6, the lower half of the image—Block C is used to identify lane marking lines. Firstly, high gray level identification is undertaken in Step S61. Next, lane marking line boundary identification and lane width identification are respectively undertaken in Step S62 and Step S63. The image is analyzed to obtain the feature points of the lane marking lines (not shown in the drawings). The lower half of the image is scanned section by section bottom up with the ROI method to update the positions of the feature points of the lane marking lines in real time. If the feature points are found in only one side of the road, the process proceeds to Step S64 to establish an instantaneous lane marking line. If the feature points are found in both sides of the road, the process proceeds to Step S65, and the image processing unit 20 can simultaneously establish two instantaneous lane marking lines $L_1$ and $L_2$. However, many country roads have none lane marking line. For the case that the system has not detected the feature points of a lane marking line, the process proceeds to Step S66.

Refer to FIG. 4 and FIG. 7 again. If the process undertakes Step S64, it means that the image processing unit 20 establishes only a single-side instantaneous lane marking line after Step S63. Herein, the right-side instantaneous lane marking line $L_1$ is used as the exemplification. Next, the process proceeds to Step S641 to establish a virtual instantaneous lane marking line $L_2$ via adding the preset standard lane width to the acquired instantaneous lane marking line $L_1$. Therefore, Step S641 is equivalent to Step S 65: establishing two instantaneous lane marking lines. Next, the process proceeds to Step S7 to extend afar the instantaneous lane marking line $L_1$ and the virtual instantaneous lane marking line $L_2$ to establish an instantaneous vanishing point $P_x$. Alternatively, an arbitrary line segment parallel to the instantaneous lane marking line may be assigned as a virtual instantaneous lane marking line to obtain an instantaneous point $P_x$.

Figure 8:
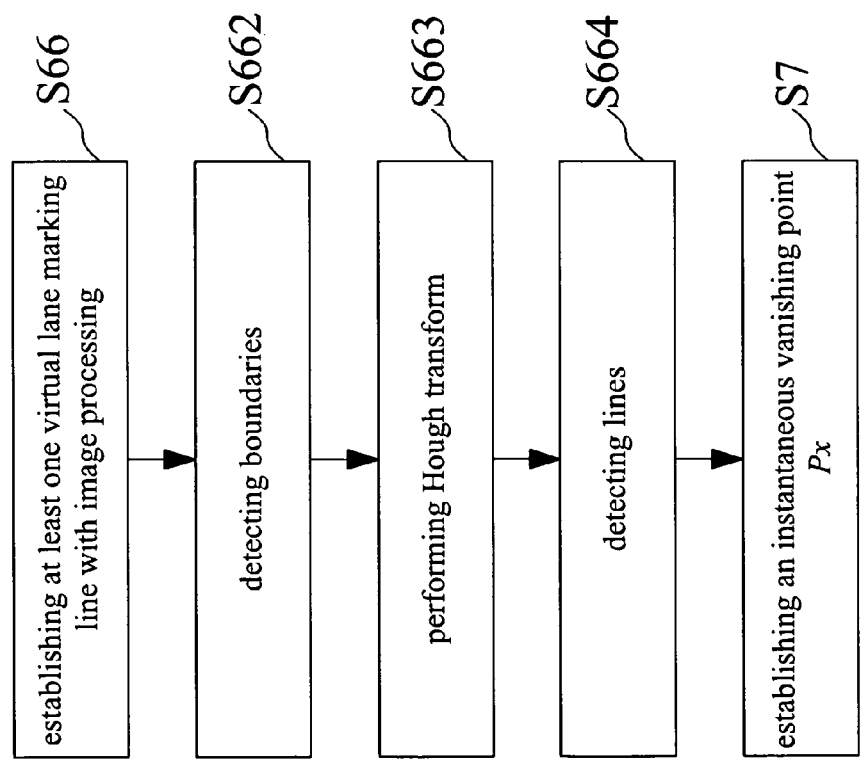
FIG. 8 is a flowchart of the process to establish instantaneous lane marking lines according to the present invention.

When none of the left and right lane marking lines is drawn on the road, the process should proceed to Step S66 to establish at least one virtual lane marking line with the image processing procedures and then obtain a vanishing point $P_x$ of the lane marking lines. Refer to FIG. 8. Firstly, boundary detection is undertaken in Step S662 to obtain several virtual feature points, wherein the virtual feature points may be derived from the linearly arranged objects before the test vehicle, such as the buildings beside the road or the vehicles before the test vehicle. Next, the Hough transform is used to analyze the feature points of the lane and transform the feature points in Step S663. Next, line detection is undertaken in Step S664 to sequentially connect the related virtual feature points to establish at least one virtual instantaneous lane marking line. Then, the instantaneous lane marking lines can be extended afar to form an instantaneous vanishing point $P_x$ in Step S7. For driving safety, when none instantaneous lane marking line is established within a specified interval of time in Step S66, the process may be designed to directly enter Step S14 (the ending of the process) from Step S66, and the headlights are restored to the preset positions.

Figure 9:
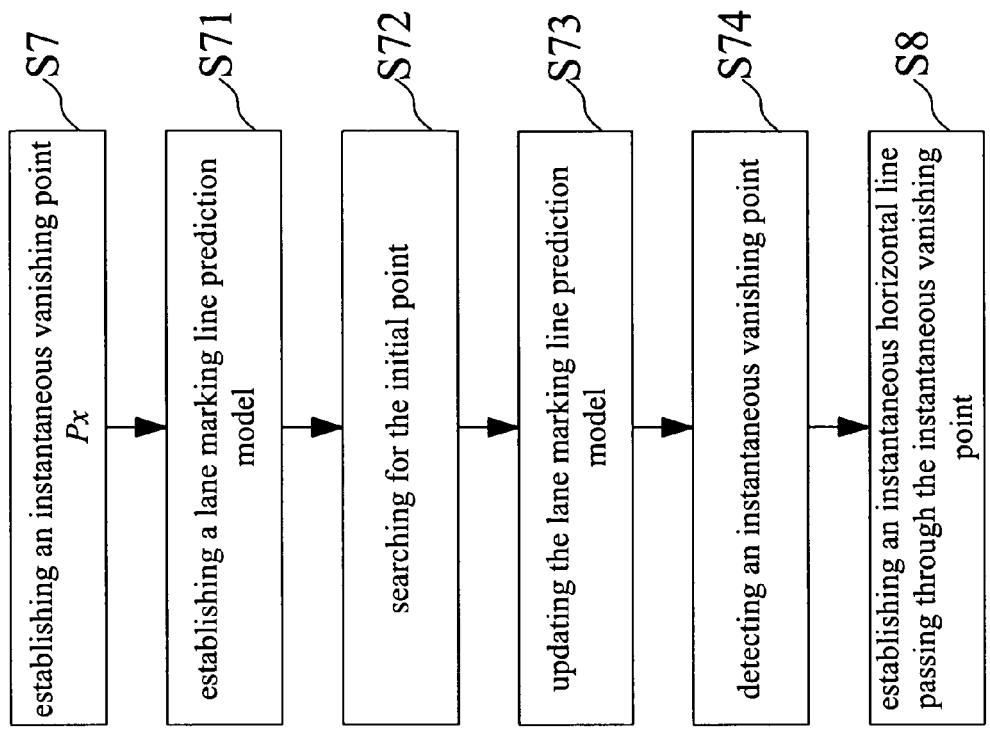
FIG. 9 is a flowchart of the process to update the model of lane marking lines according to the present invention.

After the instantaneous lane marking lines $L_1$ and $L_2$ are established, they should be updated with the time elapsed. Refer to FIG. 9 for the flowchart of establishing the lane marking line prediction model with the persistently updated instantaneous lane marking lines. Firstly, a model for predicting the lane marking lines is established in Step S71. Next, the initial point is searched for in Step S72. Next, the model for predicting the lane marking lines is updated repeatedly in Step S73. Next, the instantaneous vanishing point $P_x$ is obtained at every unit interval of time in Step S74. Then, the process proceeds to Step S8 to establish an instantaneous horizontal line $H_x$ passing through the instantaneous vanishing point $P_x$.

The Inventors have been professionals in the field of the vehicular illumination system and the related control system for many years. For the technology of establishing the model of lane marking lines (including the vanishing point) may be also referred to a Taiwan patent No. 96145498 "Method and Device for Detecting Deviation of Vehicle", which is one of the inventions of the Inventors. The establishment of the instantaneous vanishing point via the intersection of two or more instantaneous lane marking lines is only one of the preferred embodiments of the present invention, and the present invention is not limited by this embodiment. A single instantaneous lane marking line and a virtual instantaneous lane marking line, which is a line segment parallel to the instantaneous lane marking line, may also be extended afar to form a vanishing point. The vanishing point obtained in either of the two embodiments can be used to draw an instantaneous horizontal line.

Figure 10:
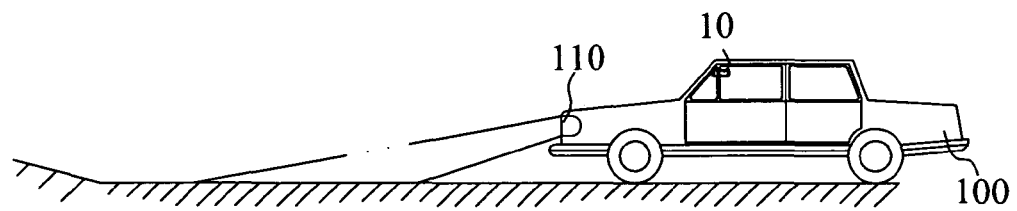
FIGS. 10(*a*)-10(*c*) are diagrams schematically showing the present invention applies to a case that a vehicle is moving uphill.
Figure 10:
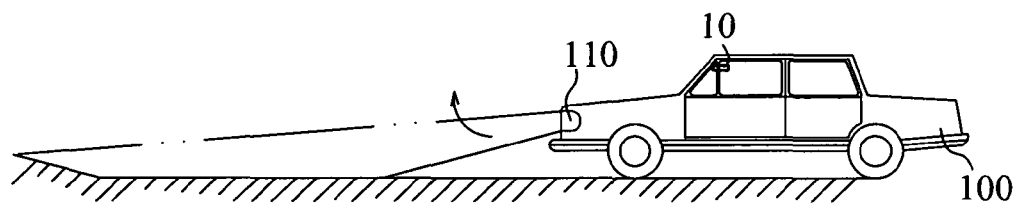
Figure 10:
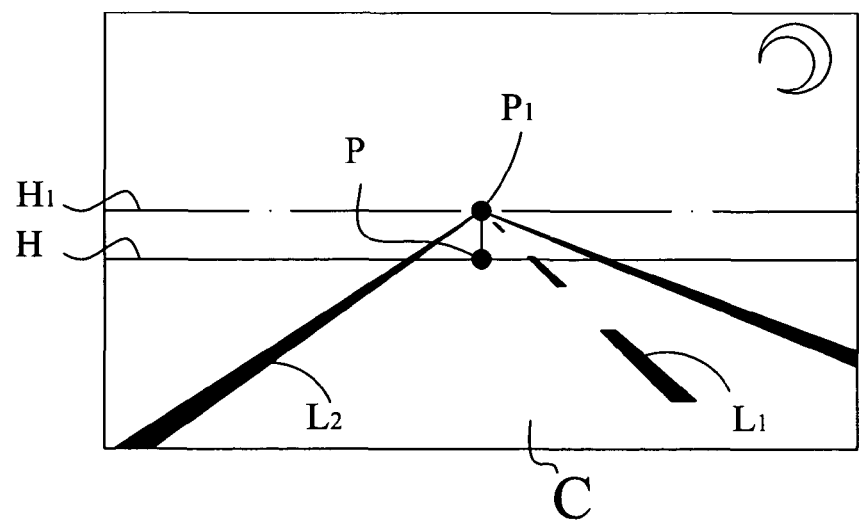
Figure 11:
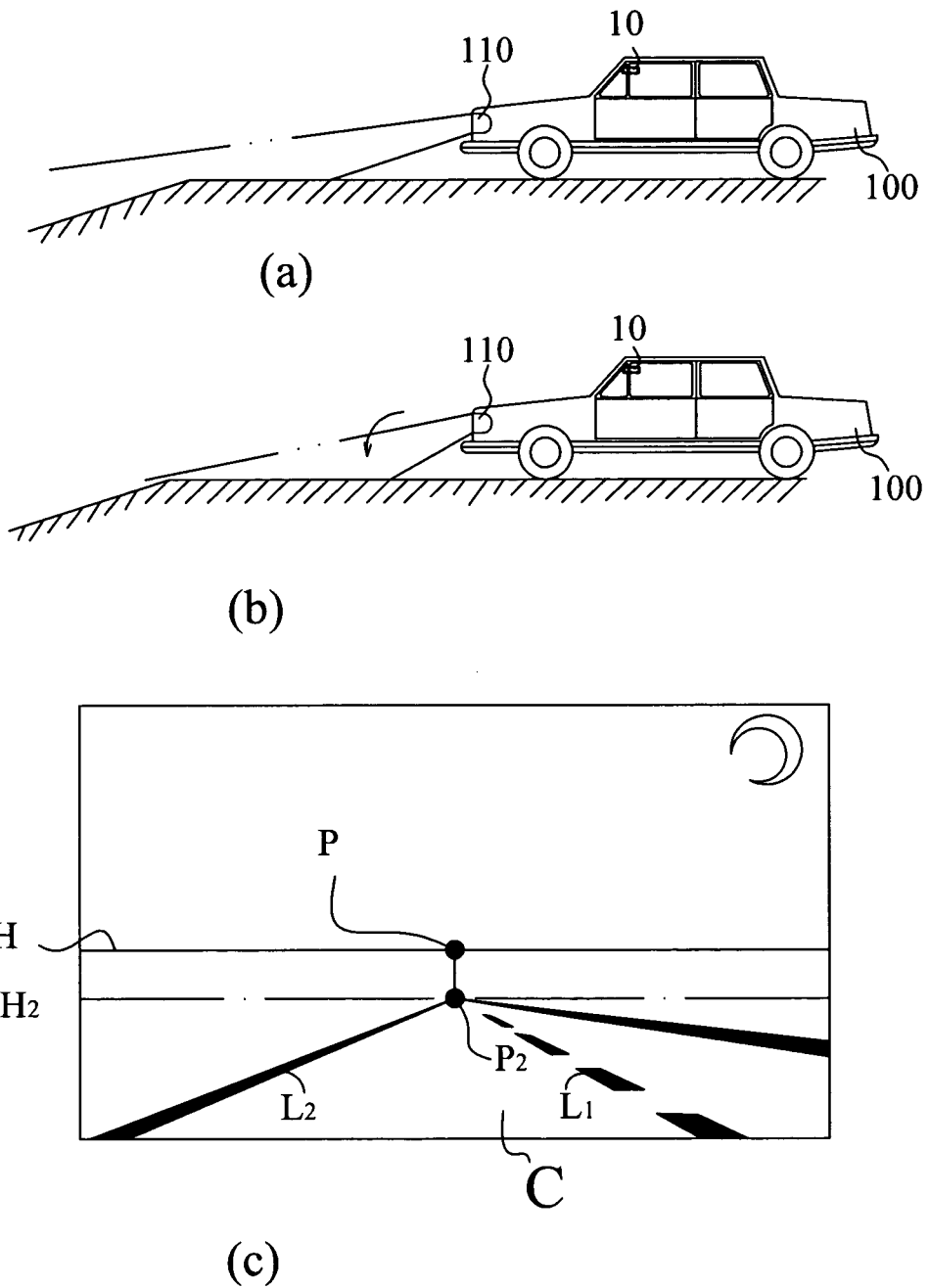
FIGS. 11(a)-11(c) are diagrams schematically showing the present invention applies to a case that a vehicle is moving downhill.

Refer to FIGS. 10(a)-10(c) diagrams schematically showing the calculation of the tilt angle and the adjustment of the headlights 110 when a vehicle is moving uphill or head-up by uneven load. Refer to FIGS. 11(a)-11(c) diagrams schematically showing the calculation of the tilt angle and the adjustment of the headlights 110 when a vehicle is moving downhill or tail-up by uneven load. Refer to FIG. 10(a) and FIG. 3. When there is an uphill road before the vehicle, the camera 10 captures the image of the road in Step S4. Via from Step S4 to Step S8 are established an instantaneous vanishing point $P_x$ and an instantaneous horizontal line $H_x$, which are respectively denoted by $P_1$ and $H_1$ shown in FIG. 10(a). Next, the process proceeds to Step S9 to calculate the displacement between the datum horizontal line H and the instantaneous horizontal line $H_1$. The datum horizontal line H is assigned to have a value of 0; the horizontal line thereabove has a positive value, and the horizontal therebelow has a negative value. The displacement is defined to be the value of the datum horizontal line H minus the value of the instantaneous horizontal line $H_1$ ($H-H_1$). Therefore, the displacement is negative in FIG. 10(a), which denotes that the road is uphill.

In Step S10, the displacement and the focal length of the camera 10 are used to calculate the slope of the inclined road before the vehicle. The slope also equals to the tilt angle of the vehicle when the vehicle is at the junction of the plane and the incline. In Step S101, every tilt angle $\theta_n$ is recorded, wherein n is the ordinal number of a recording action. In Step S11, the angle adjustment $\Delta\theta$ is calculated. The adjustment of the headlights should meet the regulation about the altitude and area of headlights lest the headlights cause dazzling glare and danger. The continuously accumulated angles would result in improper headlight adjustment. Thus is calculated the difference of two tilt angles respectively obtained at two adjacent time points. In other words, the angle difference equals to the current tilt angle minus the preceding tilt angle. The angle adjustment $\Delta\theta$ used in Step S11 is calculated with Equation (4):

$$\Delta\theta = \theta_n - \theta_{n-1} \qquad (4)$$

In Step S12, the angle adjustment $\Delta\theta$ is converted into a control signal. In Step S13, the level adjusting controllers 50 receive the control signal and adjust the headlights according to the control signal. After Step S13, the process returns to Step 4 again to capture the road image before the vehicle. The process will not proceed to Step S14 for ending until it is determined to be day in Step S5, or until none lane marking line is detected for a period of time in Step S6, or until the user himself turns off the system. The same principle also applies to the case shown in FIGS. 11(a)-11(c), wherein a vehicle moves downhill, and wherein the instantaneous vanishing point $P_x$ and the instantaneous horizontal line $H_x$ are respectively denoted by $P_2$ and $H_2$. When in a downhill case, the instantaneous vanishing point $P_2$ and the instantaneous horizontal line $H_2$ are below the datum vanishing point P and the datum horizontal line H. Therefore, the displacement—the value of the datum horizontal line minus the value of the instantaneous horizontal line—is positive. When the same principle applies to the case that the vehicle is tail-up by uneven load, the technical contents is similar and will not repeated herein.

In addition to adjusting the headlights, the vehicular tilt-sensing method of the present invention may also apply to leveling the vehicular suspension system, balancing the load of a vehicle, etc. Firstly, a datum vanishing point and a datum horizontal line are established when the vehicle is on an absolute horizontal plane and loaded uniformly. When the number of the passengers varies or the load is uneven, an instantaneous vanishing point and an instantaneous horizontal line are worked out. Next, the datum horizontal line and the instantaneous horizontal line are used to calculate the displacement. Next, Step S9 and Step S10 described above are used to obtain the tilt angle. Then, the suspension system or the load is adjusted thereby.

Besides, the tilt-sensing system may also apply to the electronic parking brake (EPB) system. In a common EPB system, a start button connects with a parking-enable device and a braking caliper. The parking-enable device uses a motor, a non-return mechanism, a reduction gear mechanism, etc., to enable the braking caliper to generate braking force. The vehicular tilt-sensing method of the present invention can detect the tilt angle of a vehicle. According to the tilt angle, the EPB system can determine the driving force of the motor and control the braking force thereof.

In conclusion, the vehicular tilt-sensing method of the present invention not only features high precision, high sensitivity and instantaneity but also can predict the road status. The automatic headlight leveling system using the method naturally succeeds to the advantages of the method. The method and system of the present invention can provide a road-adaptive illumination for the driver and enhance the safety of night driving. Besides, the present invention can be used to automatically turn on/off the headlights. Such a function further increases the utility of the present invention.

The embodiments have been described above to demonstrate the present invention and enable the persons skilled in the art to understand, make and use the present invention. However, the embodiments are not intended to limit the scope of the present invention. Any equivalent modification or variation according to the spirit of the present invention is to be also included within the scope of the present invention, which is based on the claims stated below.

What is claimed is:

1. A vehicular tilt-sensing method, applying to detecting tilt of a vehicle, and comprising steps:
    capturing an image of a road before said vehicle;
    performing image processing on said image of said road to obtain at least one instantaneous lane marking line;
    using said at least one instantaneous lane marking line to calculate an instantaneous vanishing point and an instantaneous horizontal line passing said instantaneous vanishing point;
    presetting a datum horizontal line;
    calculating a displacement from said datum horizontal line to said instantaneous horizontal line; and
    using said displacement and a focal length used to acquire said instantaneous vanishing point to calculate a tilt angle of said vehicle.

2. The vehicular tilt-sensing method according to claim 1, wherein said step of presetting a datum horizontal line includes uniformly loading said vehicle, locating said vehicle on an absolute horizontal plane, and determining a datum vanishing point; and drawing a line passing through said datum vanishing point to establish said datum horizontal line.

3. The vehicular tilt-sensing method according to claim 1, wherein said displacement is difference of a value of said datum horizontal line and a value of said instantaneous horizontal line.

4. The vehicular tilt-sensing method according to claim 3, wherein when said displacement is negative, said vehicle is moving uphill; when said displacement is positive, said vehicle is moving downhill.

5. The vehicular tilt-sensing method according to claim 1, wherein when said road has at least one lane marking line, said at least one lane marking line is preset to be said at least one instantaneous lane marking line in said step of performing image processing.

6. The vehicular tilt-sensing method according to claim 1, wherein said step of capturing an image of a road is realized with a CCD (Charge Coupled Device) device or a CMOS (Complementary Metal Oxide Semiconductor) device.

7. The vehicular tilt-sensing method according to claim 1, wherein said vehicle has at least one headlight; in said step of performing image processing, a status of ambient illumination is evaluated to determine whether to turn on said at least one headlight; if said at least one headlight is turned on, an illumination range of said at least one headlight is adjusted according to said tilt angle.

8. An automatic headlight leveling system, installed in a vehicle, used to control at least one headlight of said vehicle, and comprising
    an image capture device installed in a front of said vehicle and used to capture an image of a road;
    an image processing unit electrically connected with said image capture device, identifying said image of said road, performing image processing to obtain at least one instantaneous lane marking line, calculating an instantaneous vanishing point and an instantaneous horizontal line passing through said instantaneous vanishing point, presetting a datum horizontal line, calculating a displacement of said datum horizontal line and said instantaneous horizontal line, using said displacement to work out a tilt angle of said vehicle, and converting said tilt angle into a control signal; and
    at least one level adjusting controller electrically connected with said image processing unit and said at least one headlight, receiving said control signal, and adjusting an angle of said at least one headlight according to said control signal.

9. The automatic headlight leveling system according to claim 8, wherein when said vehicle is uniformly loaded and located on an absolute horizontal plane, said image processing unit extends said at least one instantaneous lane marking line afar to determine a datum vanishing point and draws a line passing through said datum vanishing point to establish said datum horizontal line.

10. The automatic headlight leveling system according to claim 8, wherein said displacement is defined to be difference of a value of said datum horizontal line and a value of said instantaneous horizontal line; when said displacement is zero, said vehicle is uniformly loaded or on a plane; when said displacement is not zero, said vehicle is unevenly loaded or on an inclined plane.

11. The automatic headlight leveling system according to claim 10, wherein when displacement is not zero but negative, said vehicle is moving uphill or in a head-up and tail-down state; when displacement is not zero but positive, said vehicle is moving downhill or in a head-down and tail-up state.

12. The automatic headlight leveling system according to claim 8, wherein said image capture device is a CCD (Charge Coupled Device) device or a CMOS (Complementary Metal Oxide Semiconductor) device.

13. The automatic headlight leveling system according to claim 8, wherein said image processing unit performs image processing on said image of said road to learn a status of ambient illumination to determine whether to turn on/off said at least one headlight.

14. The automatic headlight leveling system according to claim 8, wherein said image processing unit obtains a plurality of feature points of at least one virtual lane marking line from said image of said road, uses a Hough transform to perform a space feature transformation on said feature points of said at least one virtual lane marking line, and sequentially joins said feature points of said at least one virtual lane marking line to form at least one instantaneous lane marking line.

15. The automatic headlight leveling system according to claim 8, wherein when said road has at least one lane marking line, said image processing unit identifies said at least one lane marking line and presets said at least one lane marking line to be said at least one instantaneous lane marking line.

16. The automatic headlight leveling system according to claim 8, wherein said tilt angle is calculated with said displacement and a focal length of a lens of said image capture device; an angle adjustment is defined to be difference of two said tilt angles of two adjacent time point; said control signal is derived from said angle adjustment.

17. A vehicular tilt-sensing method, applying to detecting tilt of a vehicle, and comprising steps:
- capturing surrounding images of a road before said vehicle;
- performing image processing on said surrounding images of said road to obtain a plurality of feature points of at least one virtual lane marking line, using a Hough transform to perform a space feature transformation on said feature points of said at least one virtual lane marking line, and sequentially joining said feature points of said at least one virtual lane marking line to obtain at least one instantaneous lane marking line;
- using said at least one instantaneous lane marking line to calculate an instantaneous vanishing point and an instantaneous horizontal line passing said instantaneous vanishing point;
- presetting a datum horizontal line;
- calculating a displacement from said datum horizontal line to said instantaneous horizontal line; and
- using said displacement to analyze a tilt angle of said vehicle.

* * * * *